Dec. 5, 1961 H. BRADNER ET AL 3,011,439
MAGNETIC MINE FIRING SYSTEM
Filed Sept. 13, 1944 4 Sheets-Sheet 1
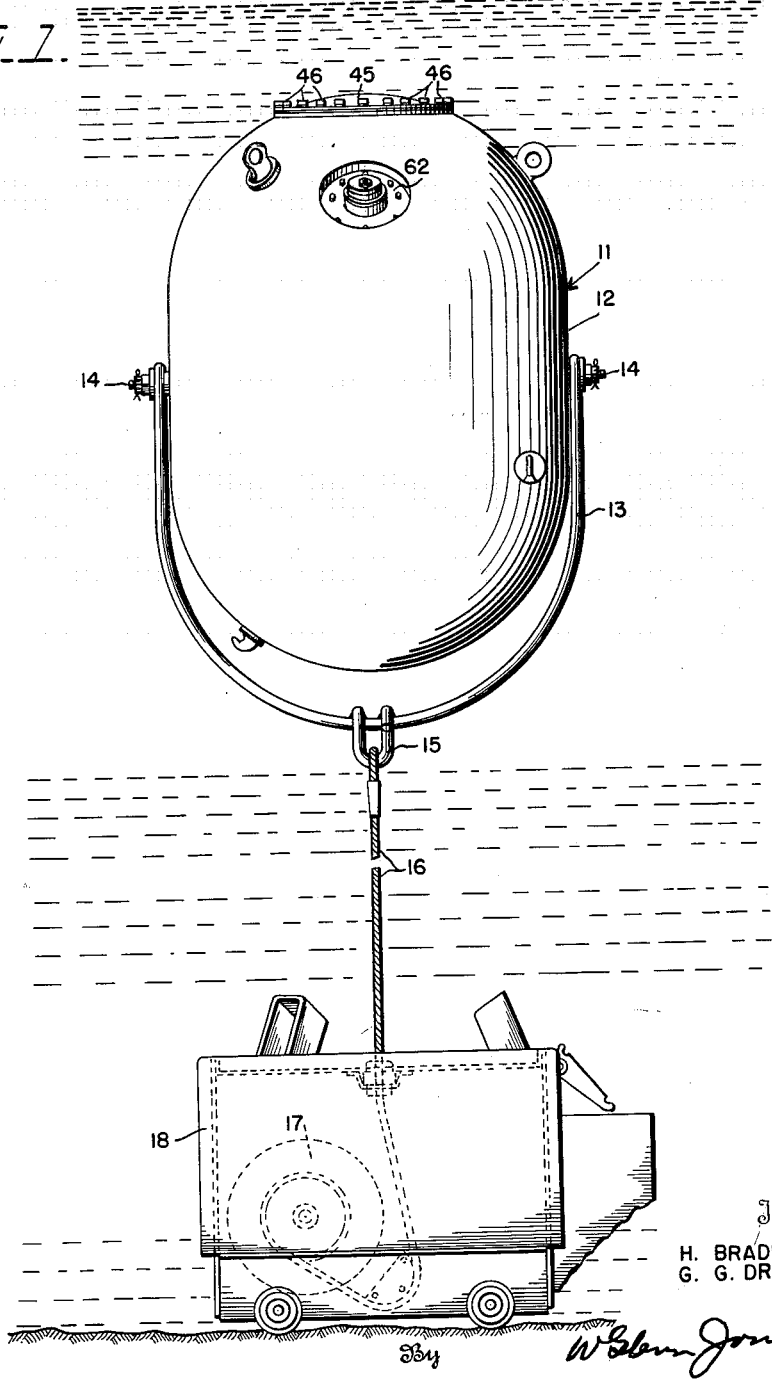
Inventors
H. BRADNER
G. G. DREW

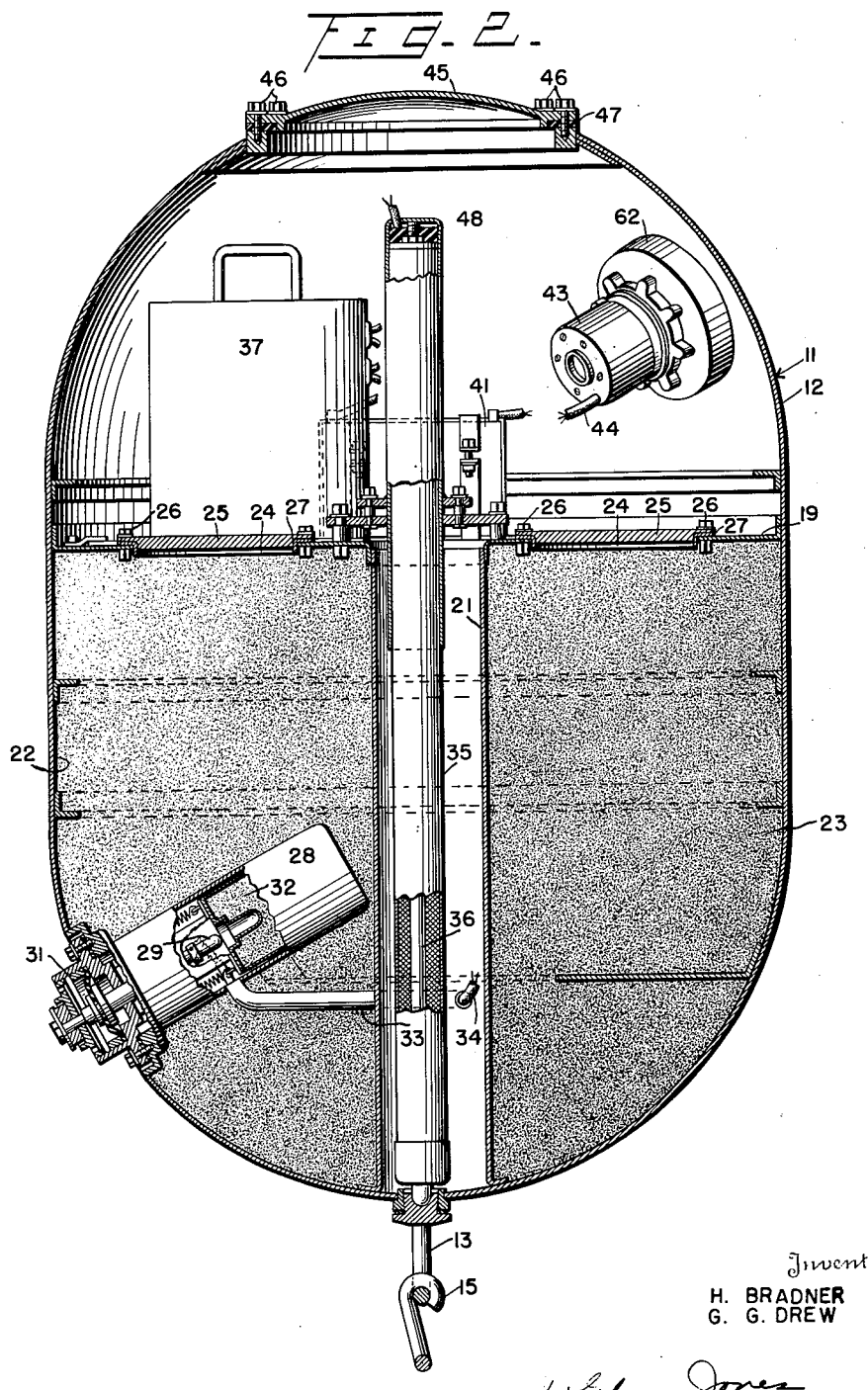

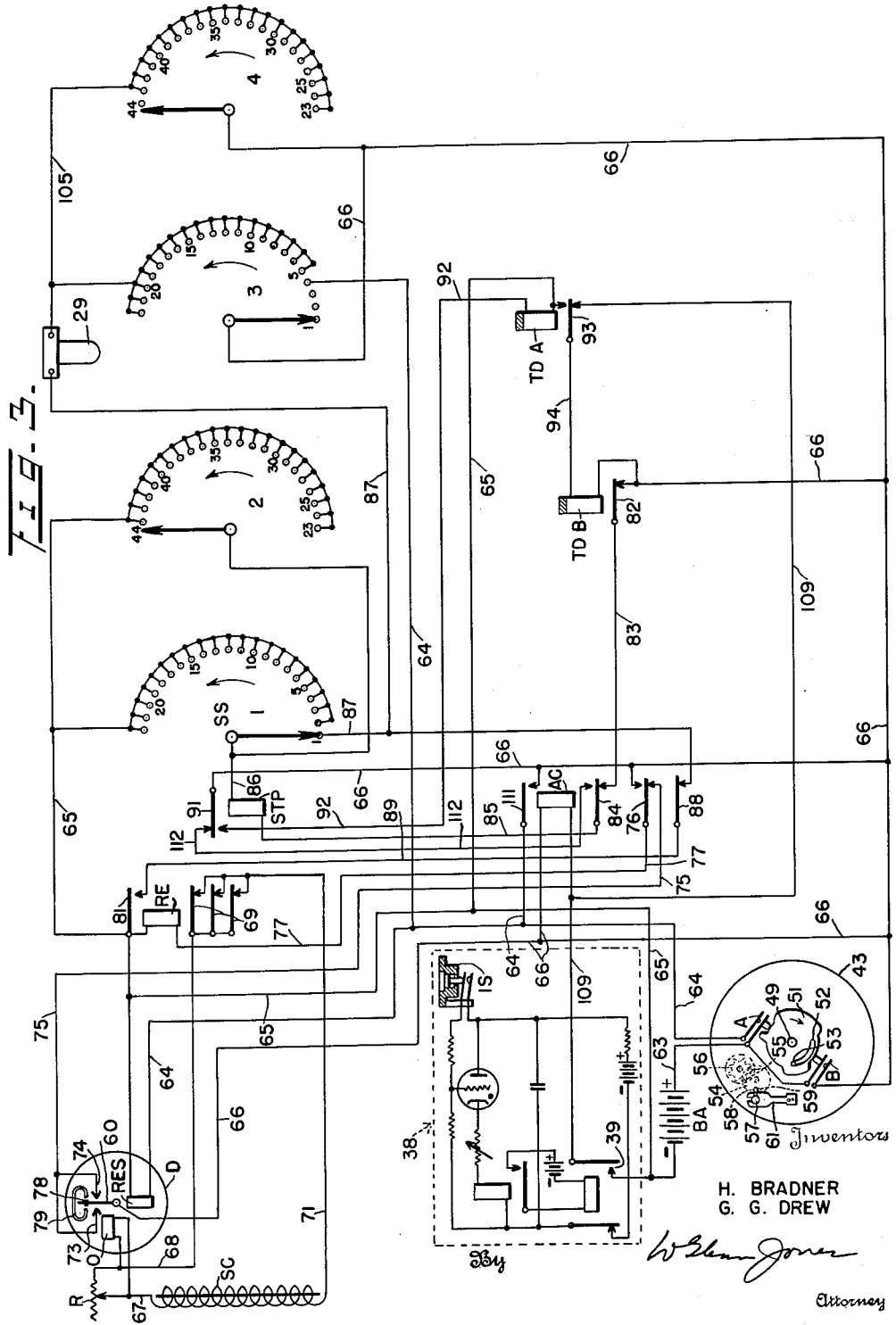

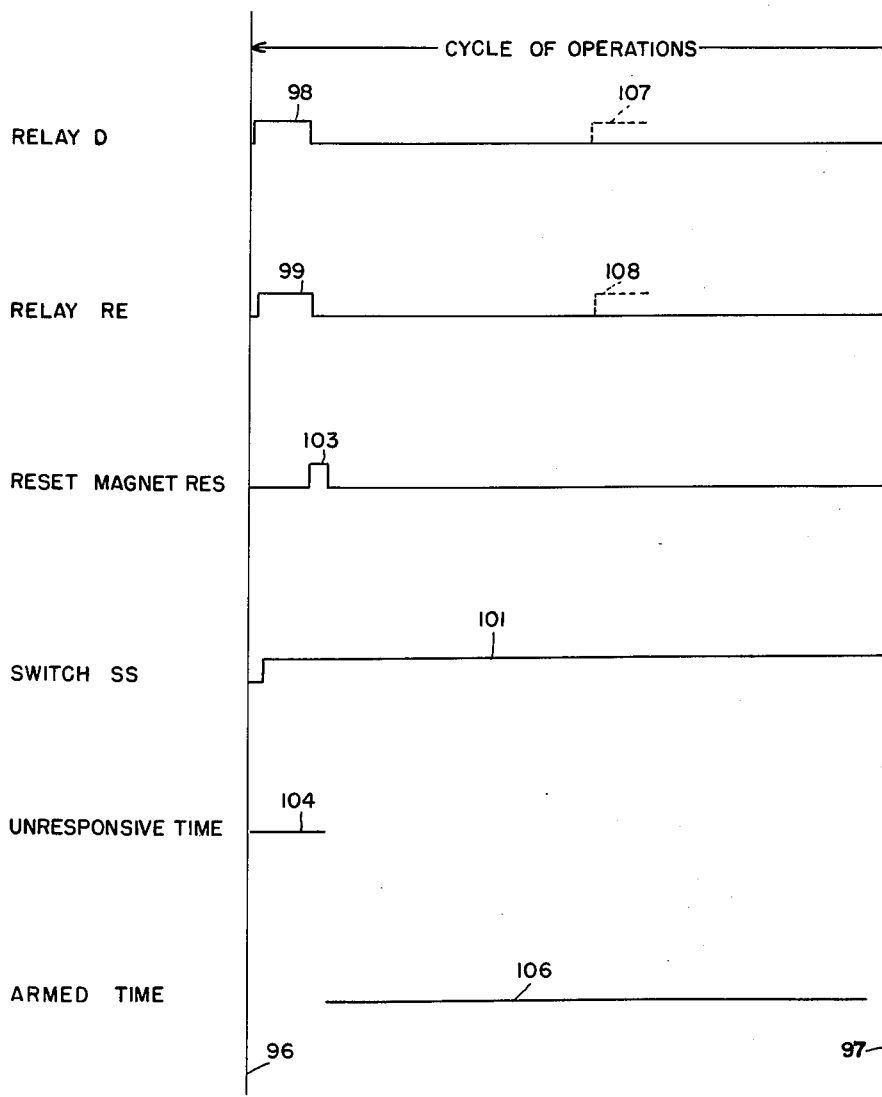

United States Patent Office 3,011,439
Patented Dec. 5, 1961

3,011,439
MAGNETIC MINE FIRING SYSTEM
Hugh Bradner, Los Angeles, Calif., and
Glen G. Drew, Washington, D.C.
Filed Sept. 13, 1944, Ser. No. 553,863
23 Claims. (Cl. 102—18)
(Granted under Title 35, U.S. Code (1952), sec. 266)

This invention relates to submarine mine firing systems of the electromagnetic induction type in which the mine is fired electrically in accordance with a pair of signals corresponding to a pair of changes in the magnetic field adjacent thereto occurring in predetermined time spaced relation and in which the mine is unresponsive to additional signals for a predetermined period of time after the first signal is received.

In the arrangement of the present invention the mine firing system includes a magnetic field sensing element and a sensitive relay responsive to signals generated thereby for initiating the operation of time delay and time measuring devices adapted to arm the mine for a predetermined period of time measured thereby, whereby the explosion of the mine is effected when the aforesaid sensitive relay responds to a second signal occurring within said armed period, the first and second signals corresponding respectively to changes of predetermined character in the magnetic field adjacent the mine such, for example, as the changes in the magnetic field caused by the movement of a steel vessel or any vessel having a ponderous amount of magnetic material therein past the mine disposed adjacent the path of travel of the vessel.

By reason of the timing devices and the circuit arrangement and connections therebetween, the time spaced relation of magnetic field changes adapted to fire the mine is such that the probability of the mine being exploded as the result of electromagnetic changes received from the well-known sweep operations of a single aircraft sweep is extremely remote.

Furthermore, in the system of the present invention new and improved means are provided to prevent the premature explosion of the mine as the result of shocks or impulses of pressure received through the water such, for example, as shocks received from countermining operations within the vicinity of the mine.

Furthermore, the mine is rendered absolutely safe for transportation, handling and planting and becomes active when a predetermined period of time has elapsed after the mine has been launched within a body of water by reason of the provision of certain safety control devices adapted to be operated in response to the pressure of the water within which the mine is launched.

The system of the present invention embodies all of the advantages of the prior devices and the additional advantage of a simple and rugged construction which will be economical to manufacture and possesses the desired qualities of reliability and efficiency in use and in operation.

One of the objects of the present invention is the provision for a mine of a new and improved mine firing system of the above general character having means for detecting a change in the magnetic field adjacent the mine when a predetermined period of time has elapsed after a first change in the magnetic field has been detected and detonating the mine when the first and second changes occur in predetermined time spaced relation.

Another object is the provision of new and improved means for controlling the intervals of time during which signals corresponding to successive changes in the magnetic field adjacent the mine are received.

Another object is the provision of new and improved means for controlling the closure of a mine firing circuit in accordance with a plurality of signal indications corresponding to changes in a magnetic field received during predetermined intervals of time and restoring the controlling means to an initial condition when signals corresponding to any of the changing conditions of the field are not received in regular order within a predetermined time interval.

Still another object of the invention is the provision of a new and improved mine firing system which is characterized by a simplicity of circuit arrangements including a minimum of circuit controlling and time measuring devices.

An additional object is the provision of new and improved means for preventing a spurious or premature firing of the mine in response to shocks received from countermining operations within the vicinity of the mine.

Still further objects, improvements and advantages will be apparent from the following detailed description taken in connection with the accompanying drawings of which:

FIG. 1 is a view of a submarine mine employing the system of the present invention and the anchoring means therefor;

FIG. 2 is an enlarged sectional view taken substantially centrally through the mine;

FIG. 3 shows in diagrammatic form the entire system; and,

FIG. 4 is a chronographic diagram illustrating various intervals during one cycle of operations of the mechanism.

Referring first to FIG. 1 of the drawings there is shown thereon a submarine mine indicated generally by the numeral 11 and comprising a casing 12 having a mooring bale 13 pivotally secured thereto as at 14 and provided with an eye or shackle 15 to which is attached one end of a mooring cable 16 adapted to be payed out from a reel 17 within an anchor 18, the reel being locked in any well-known manner when a predetermined length of cable has been payed out whereby the mine is adapted to be anchored at a predetermined depth of submersion beneath the surface of the water. The casing is provided with a transverse wall or partition 19 having a tubular member 21 secured thereto, the lower end of the tubular member being secured in any suitable manner to the casing 12. A chamber 22 is thus provided within the lower portion of the mine casing within which is arranged an explosive charge 23 of any type suitable for the purpose such, for example, as TNT or the like. There is provided within the partition 19 preferably a pair of apertures 24 through which the explosive charge is introduced within the chamber 22, a pair of covers 25 being provided to seal the apertures as by the bolts 26 and gasket 27 arranged between each of the covers and the partition 19.

The casing 12 is provided with a well 28 within which is arranged a detonator 29 adapted to be moved by a hydrostat 31 within an explosive booster charge 32 arranged within the well. There is also provided within the chamber 22 a tube or duct 33 extending between the tubular member 21 and the well 28 within which is arranged a cable 34 having a pair of electrical conductors adapted to establish an external electrical circuit to the detonator.

Within the tubular member 21 is arranged an induction pickup or search coil 35, hereinafter referred to as SC, comprising a large number of turns of relatively fine wire arranged about a rod or core 36 of magnetic material suitable for the purpose such, for example, as iron or a material composed of 78½ percent nickel and 21½ percent iron and known in the art by the trade name of Permalloy, a pair of conductors being provided to establish an external circuit connection to the search coil.

There is also secured to the upper portion of the partition 19 a firing control mechanism 37, hereinafter referred to as FM, the mechanism comprising certain time delay devices TD—A and TD—B, a switch stepping device SS, and a control relay RE therefor, which relay and devices coact to close the mine firing circuit from the battery 41, hereinafter referred to as BA, to the detonator 29, thereby causing the mine to explode whenever the presence of a vessel has been detected by the pickup coil SC and a sensitive detecting relay D operatively connected thereto, the sensitive relay being preferably of a type known in the trade as a Sensitrol and preferably being included within the firing mechanism structure.

The firing mechanism also preferably includes an anti-countermine device 38 comprising an inertia type switch IS and circuits controlled thereby adapted to close a pair of contacts 39 in response to the operation of the switch IS as a countermine shock or pressure impulse is received through the water. Contacts 39 are arranged to operate a telephone relay AC having a plurality of contacts thereon, thereby to prevent the sensitive relay from being actuated sufficiently to close the contacts thereof or to respond to signals generated by the pickup coil SC as a result of the shock and to perform additional protective functions of the mechanism FM, as will more clearly appear as the description proceeds. A type of inertia switch and associated circuits suitable for this purpose is disclosed and claimed in the copending application of Seth W. Booth for Inertia Switch and Means Controlled Thereby, Serial No. 484,854, filed April 28, 1943, now Patent No. 2,968,240. Suffice it to state herein that such a switch in response to shocks received thereby, is adapted to close the pair of make contacts 39 for a predetermined period of time such, for example, as three seconds.

The battery 41 is normally disconnected from the firing mechanism by the contacts B of a clock mechanism 43 adapted to be set in operation in response to the pressure of the water within which the mine is planted and complete a circuit from the battery by way of the cable 44 when a predetermined period of time has elapsed after the mine has been planted. The clock is also provided with a second pair of contacts A adapted to be closed momentarily prior to the closing of the battery circuit thereby to restore the sensitive detecting relay to a neutral or reset position in the event that the relay should have been moved from the neutral position thereof for any cause such, for example, as the result of the shock received at the time of planting of the mine.

The upper portion of the casing 12 is provided with an aperture adapted to be closed by the cover 45 secured thereto as by the bolts 46, a suitable gasket 47 being preferably provided between the cover and the casing to prevent the entrance of water within the chamber 48 or the escape of air therefrom when the mine is submerged within the water. The air chamber 48, it will be understood, is of sufficient size to cause the mine to be positively buoyant and assume an upright position within the water with the induction pickup coil 35 thereof vertical at all times by reason of the pivoted bale 13 employed for mooring the mine.

The starting clock 43 is provided with a source of stored energy such, for example, as a spring motor operatively connected to a shaft 49, FIG. 3, having a cam 51 thereon provided with an arcuate portion 52 within which is arranged a stop pin 53, the movement of the cam being limited by the length of the arcuate slotted portion. The spring motor also causes the operation of an escapement mechanism comprising a pivoted wheel 54 having a pair of escapement pins 55 thereon adapted to be engaged alternately by the teeth of the escapement gear 56 as the cam is moved from the initial position to the final position thereof. There is also provided a plunger 57 having a pin 58 extending outwardly therefrom adapted to be maintained within the path of travel of a stop member 59 arranged on the wheel 54 by the spring 61 in registered engagement with the plunger. The plunger 57 is operatively connected to a hydrostat arranged within the well 62, FIGS. 1 and 2, within the casing 12 of the mine and adapted to be moved inwardly by the hydrostat sufficiently for the pin 58 to be disengaged from the stop member 59 as the hydrostat operates, thereby setting the clock in operation after the mine has been launched.

The operation of the system will best be understood by reference to FIG. 3 of the drawings on which is shown in diagrammatic form the complete electrical system. Let it be assumed, by way of example, that the resistance R has been adjusted in accordance with a predetermined sensitivity of the relay D and that the mine has been launched within a body of water and moored beneath the surface of the water by the bale 13, mooring cable 16 and anchor 18, and let it further be assumed that the detonator 29 has been moved by the pressure of the water against the hydrostat 31 to an extended position within the booster charge 32 and that the plunger 57 of the starting clock has been moved by the pressure of the water against the clock hydrostat sufficiently to move the pin 58 thereof out of engagement with the stop member 59 and set the starting clock in operation. When a predetermined period of time such, for example, as ten minutes has elapsed after the starting clock has been set in operation, the switch contacts A thereof are moved by the cam 51 to closed position, thereby closing a circuit from the positive terminal of battery BA, conductor 63, contacts A of the starting clock, conductor 64, the reset magnet RES of relay D from when the circuit is continued by way of conductor 65 to the negative terminal of battery BA, thereby causing the reset magent RES to operate and restore the contact element 60 of relay D to the neutral or mid position thereof in the event that the element may have been previously moved away from such position for any reason such, fore example, as the shock which the mine receives at the time of launching. As the cam 51 continues to rotate, the switch contacts A of the starting clock are moved to open position, thereby interrupting the aforesaid circuit to the reset magnet RES of relay D and causing the reset magnet to release.

When the starting clock has operated for an additional period of time such, for example, as twenty-five minutes after the clock has been set in operation, the clock contacts B are closed by the cam 51 thereby applying battery from positive terminal of battery BA by way of conductor 63 and contacts B of the starting clock to conductor 66 and thus to the movable contact element 60 of the detecting relay D. The mine is now in readiness to receive a signal from the search coil SC corresponding to a change in the magnetic field adjacent the mine.

As a vessel approaches within the vicinity of the mine, the magnetic field adjacent the mine is altered by the presence of the vessel sufficiently to induce an electromotive force within the search coil SC. This electromotive force causes a current to flow over the following circuit: one end of the search coil SC, conductor 67, winding of the operate magnet O of relay D and variable resistance R in parallel, conductor 68, armatures 69 and break contacts of relay RE in parallel, conductor 71 and thence to the opposite end of the winding of the search coil, thereby causing the contact element 60, carried by the operate winding, to be moved into engagement with contact 73 or 74, as the case may be. It will be noted that the relay RE controls three switches 69 in parallel for closing the detector circuit from conductor 68 to conductor 71. Since the search coil generates extremely small voltages, a plurality of switches are arranged in parallel to assure that at least one effectively closes. This arrangement, furthermore, materially reduces the contact resistance, it being obvious that a high contact resistance appreciably decreases the sensitivity of the detector circuit. When this occurs, a circuit is closed from the positive terminal of battery BA by way of conductor 63, contacts B of the starting clock, conductor 66, contact element 60 of relay D and contact 73 or 74 thereof, conductor 75, break contact and armature 76 of relay AC, conductor 77, winding of relay RE and thence by way of conductor 65 to the negative terminal of battery BA, thereby causing relay RE to operate. As armatures 69 of relay RE move away from their break contacts, the circuit to the operate winding of relay D is interrupted, but contact element 60 thereof does not move away from engagement with its make contact by reason of the magnetic keeper 78 which becomes locked to a permanent magnet 79 when the contacts 60 and 73 or 74 become engaged, thereby to maintain the engagement of the contacts until the reset magnet RES of relay D is energized.

Reset magnet RES, when energized, controls means for forcibly restoring contact element 60 to the neutral or mid position thereof between contacts 73 and 74 and for restraining the element in such position. Operate winding O and the element 60, therefore, are not free to move until the reset magnet is deenergized.

Opening of the circuit between search coil SC and operate winding O of relay D prevents the storing of inductive energy in the search coil, thereby obviating spurious movement of the operate winding, upon the release thereof, by reason of the current otherwise caused to flow therethrough upon the dissipation of the energy stored in the search coil.

As armature 81 of relay RE engages its make contact, a circuit for initiating the operation of switch SS is closed from positive battery on conductor 66 by way of break contact and armature 82 of relay TD—B, conductor 83, break contact and armature 84 of relay AC, conductor 85, stepping magnet STP of switch SS, conductor 86, wiper 1 and contact 1 of switch SS, conductor 87, break contact and armature 88 of relay AC, conductor 89, make contact and armature 81 of relay RE, and thence by way of conductor 65 to the negative terminal of battery BA thereby operating the stepping magnet of switch SS. Switch SS is of a type in which the brushes or wipers thereof are stepped ahead to the next succeeding contact of the switch banks when the stepping magnet thereof is released. The wipers of switch SS, therefore, do not step ahead until the operate circuit to the stepping magnet is interrupted.

As armature 91 of switch SS engages its make contact, a circuit is closed from positive battery on conductor 66 by way of armature 91 and make contact of switch SS, conductor 92, winding of relay TD—A, and thence by way of conductor 65 to the negative terminal of battery BA thereby causing relay TD—A to operate. As armature 93 of relay TD—A engages the make contact thereof, a circuit is closed from positive battery on conductor 66 by way of the winding of relay TD—B, conductor 94, armature 93 and make contact of relay TD—A and thence by way of conductor 65 to the negative terminal of battery BA thereby causing relay TD—B to operate and move the armature 82 out of engagement with the break contact thereof. As armature 82 moves away from its break contact, the operate circuit to the stepping magnet STP of switch SS is interrupted thereby causing the stepping magnet to release and the switch wipers to be stepped ahead into engagement with contacts 2 of their respective switch banks.

As armature 91 of switch SS moves out of engagement with the make contact thereof, the operate circuit to relay TD—A is interrupted and relay TD—A releases. As armature 93 of relay TD—A moves away from the make contact thereof, the operate circuit to relay TD—B is interrupted thereby causing relay TD—B to be released. Relays TD—A and TD—B are slow releasing relays by reason of the provision of a copper sleeve or slug arranged about the core of each electromagnet whereby the release of each of the relays TD—A and TD—B occurs after a suitable delay such, for example, as .37 second after the operate circuits thereof have been interrupted, the time of release of the relays in succession being approximately .74 second.

Switch SS, it will be noted, is provided with four wipers 1 through 4 of which the wipers 1 and 3 are adapted to engage the contacts of their respective switch banks during the first half revolution of the wipers and the wipers 2 and 4 are adapted to engage the contacts of their respective switch banks during the latter half of the revolution of the wipers. The switch is, therefore, adapted to step the wipers ahead for 44 successive steps before the wipers are brought to rest in the initial home position thereof with wipers 1 and 3 in engagement with contacts 1 of their respective switch banks and wipers 2 and 4 disengaged from contacts 44 of their respective switch banks. Furthermore, wipers 1 and 2, it will be noted, are electrically connected together and to the winding of stepping magnet STP and are electrically connectable to contacts 2 to 22 of bank 1 and to contacts 23 to 44 of bank 2 of switch SS as the switch rotates. These banks are connected to conductor 65 in electrical connection with the negative terminal of battery BA and the wipers are preferably of the bridging type adapted to engage the next succeeding contact of their respective switch banks before moving out of engagement with the preceding bank contact, thereby providing an arrangement in which negative battery is applied continuously to the winding of stepping magnet STP in all positions of switch SS except the home position thereof.

Accordingly, when armature 82 of relay TD—B engages its break contact a circuit is closed by way of positive battery on conductor 66, armature 82 and break contact of relay TD—B, conductor 83, break contact and armature 84 of relay AC, conductor 85, winding STP of switch SS, and thence by way of wiper 1 and contact 2 of bank 1 of switch SS to negative battery on conuctor 65, thereby causing stepping magnet STP to operate. Operation of the stepping magnet causes relays TD—A and TD—B to operate in succession, as described in the foregoing, thereby to interrupt the operate circuit to the stepping magnet and to cause the switch to take an additional step. Thereafter, relays TD—A and TD—B again release in succession after an interval of .74 seconds to apply battery potential to the stepping magnet. Accordingly, the operations and releases of the switch SS and the TD relays are repeated a sufficient number of times to step the wipers through one full rotation to the home positions thereof. After a time delay of .74 second, therefore, following the return of the wipers to their initial positions the circuit is restored to its initial condition in which further operation of the switch is initiated only in response to the operation of the relay D.

Thus far the manner in which the operation of the selector switch is initiated and the manner in which the step-by-step movement thereof has been accomplished to perform one cycle of operations of the mechanism has been considered. These operations are illustrated graphically in FIG. 4 in which the spacing of the vertical lines 96, 97 indicate the time of one cycle of operations as measured by the stepping switch SS. Each cycle begins when relay D operates, as indicated by the raised line portion 98. Relay D causes relay RE to operate, which operation is indicated by the raised line portion 99, and relay RE in turn initiates the operation of switch SS, the operation of which is indicated by the raised line portion 101, the cycle being terminated when the contacts of relay TD—B close after switch SS has moved to its home position, as described in the foregoing.

When the wipers of switch SS engage contact 4 of their respective switch banks a circuit is closed from positive potential on conductor 66 by way of wiper 3 and contact 4 of switch bank 3, conductor 64, and thence by way of reset magnet RES of relay D to negative potential on conductor 65, thereby causing the reset magnet to operate and forcibly restore contact element 60 of relay D to the neutral or mid position thereof. Operation of the reset magnet is illustrated graphically in FIG. 4 by the raised line portion 103 thereon. As contact element 60 of relay D moves out of engagement with one of the fixed contacts 73, 74 thereof, the operate circuit to relay RE, previously traced, is interrupted, thereby causing relay RE to release and to restore the circuit between relay D and the search coil SC. However, element 60 is not free to move until the reset magnet RES is deenergized, the magnet being deenergized when the wipers of switch SS engage contact 5 of their respective banks. Thus, it is seen that from the initial operation of relay D until switch SS has moved into its fifth position, relay D is rendered unresponsive to signals generated by the search coil SC for the reason that the contact element 60 thereof is first locked to the magnet 79 for a period of time during which the circuit between the operate winding O and the search coil is also interrupted, and thereafter locked for an additional interval of time in the neutral position thereof by the reset magnet, the total unresponsive time of relay D being illustrated by the heavy line 104 in FIG. 4.

It will be noted that wipers 3 and 4 of switch SS are electrically connected together and that contacts 5 through 22 of bank 3 and contacts 23 through 43 of bank 4 of switch SS are electrically connected together and to detonator 29 by way of a conductor 105, thereby to apply positive battery to the detonator during the time measured by the movement of switch SS from the fifth through the forty-third positions thereof. This interval of time is indicated in FIG. 4 by the heavy line 106 and represents an interval of time during which the mine is armed for the reason that a disturbance in the magnetic field adjacent the mine caused by a vessel which initiates the operation of the switch SS and which occurs during this interval operates to apply negative battery to the other terminal of the detonator thereby to fire and explode the mine.

Let it be assumed, by way of example, that such a change occurs in the magnetic field to cause the successive operations of relay D and relay RE as indicated by the dashed lines 107 and 108 respecively of FIG. 4. As relay RE operates, armature 81 engages the make contact thereof to close a firing circuit to the detonator from positive battery on conductor 66 by way of wiper 3 or 4, as the case may be, and its associated contact bank, conductor 105, detonator 29, conductor 87, break contact and armature 88 of relay AC, conductor 89, and thence by way of make contact and armature 81 of relay RE to negative battery on conductor 65, thereby firing the detonator and causing the mine to be exploded beneath a vulnerable portion of the vessel.

It will be understood that banks 3 and 4 of switch SS may be wired such that any desired shorter armed interval of the mine may be provided. However, contact 44 on bank 4 must be left unconnected by reason of the bridging wipers employed, a circuit otherwise being completed to the detonator by way of positive battery on conductor 66, wiper 4 and contact 44 of bank 4, conductor 105, detonator 29, conductor 87, contact 1 of bank 1 and wiper 1, wiper 2 and thence by way of contact 44 of bank 2 to negative potential on conductor 65.

The operation of the system in response to the sweep operations of an aircraft will now be considered. It is the practice to place sweeping apparatus, which produces rapidly varying magnetic fields adapted to induce signals in the search coil, on an aircraft whereby a large area of the surface of the sea may be rapidly swept, thereby reducing the amount of equipment necessary for such purpose. By reason of the provision of the unresponsive period described in the foregoing, the system is rendered unresponsive to a second signal for an appreciable period of time such, for example, as 2¼ seconds, thereby to eliminate the possibility of sweeping the mine by the employment of aircraft as an aircraft carried sweep will pass from the vicinity of the mine within such interval of time after inducing the first signal. In such case, therefore, response of the system to signals produced by sweep operations merely initiates the operation of the selector switch SS and causes the same to operate through a cycle of operations without producing a firing operation of the system.

The anti-countermine operation of the system will now be described. Assuming first that the switch mechanism is in the home position thereof, when a shock is received by the mine through the water, the inertia switch IS operates to close contacts 39 for a relatively short interval of time such, for example, as three seconds, thereby to close a circuit from positive battery on conductor 66 by way of the winding of relay AC, conductor 109 and thence by way of contacts 39 of anti-countermine device 38 to negative battery on conductor 65, thereby to operate relay AC. A circuit also is completed from positive battery on conductor 66 by way of the winding of relay TD—B, conductor 94, armature 93 and break contact of relay TD—A, conductor 109, and thence by way of contacts 39 of anti-countermine device 38 to negative battery on conductor 65, thereby to operate relay TD—B. As armature 111 engages make contact of relay AC a circuit is completed from positive battery on conductor 66 by way of make contact and armature 111 of relay AC, conductor 64 and thence by way of the winding of the reset magnet RES to negative battery on conductor 65.

As armature 76 engages make contact of relay AC a circuit is completed from positive battery on conductor 66 by way of armature 76 and make contact of relay AC, conductor 77, and thence by way of the winding of relay RE to negative potential on conductor 65, thereby causing relay RE to operate. Operation of relay RE, as previously described, interrupts the circuit between the search coil SC and the operate winding O of relay D, thereby to prevent storing of inductive energy in the search coil as a result of changes in the magnetic field adjacent thereto caused by the shock.

Armature 81 and make contact of relay RE in the initiating and firing circuits of the system also close as relay RE operates. However, armature 88 and break contact of relay AC, also included within the initiating and firing circuits of the system in series with relay RE make contacts, open to interrupt such circuits, as relay AC operates.

As armature 84 and make contact of relay AC engage, a circuit is completed for applying positive battery to the winding of stepping magnet STP from positive battery on conductor 66 by way of armature 91 and break contact of stepping magnet STP, conductor 112, make contact and armature 84 of relay AC, and thence by way of conductor 85 to the stepping magnet STP, positive battery thus applied by way of the interrupter contacts of the stepping magnet being for the purpose of operating the switch SS on self-interruptions when the inertia switch IS closes at a time when the switch SS is moved out of the home position during a cycle of operations thereof as will appear in greater detail hereinafter.

By reason of the successive operations of relays AC and RE in response to a countermine shock, armature 88 and break contact of relay AC close before armature 81 and make contact of relay RE open when the operate circuit to relay AC is interrupted as contacts 39 of anti-countermine device 38 open at the end of the aforesaid three second interval provided thereby. Accordingly, negative battery momentarily is applied by way of conductor 65, armature 81 and make contact of relay RE, conductor 89, armature 88 and break contact of relay AC, conductor 87, and thence by way of contact 1 and wiper 1 of switch SS to stepping magnet STP thereof. Spurious operation of the stepping magnet is prevented, however, by reason of the fact that the operate circuit therefor is interrupted by armature 82 and break contact of relay TD—B, it being recalled that relay TD—B operated when contacts 39 of anti-countermine device 38 closed in response to the shock received by the mine. Accordingly, the operate circuit to the stepping magnet is maintained in an open condition for approximately .37 second after the operate circuit to relay TD—B is interrupted when contacts 39 of the anti-countermine device open at the end of the three second interval provided thereby.

When switch IS operates at a time when the mechanism is in operation, relays AC, RE, and TD—B operate in the same manner as when the shock occurs at a time when the switch mechanism is in the home position thereof, thereby to restrain relay D forcibly in an unresponsive condition thereof, to interrupt the circuit between the operate winding O thereof and the search coil SC, and to interrupt the initiating and firing circuits of the system during the entire protective interval provided by the anti-countermine device. During this interval the switch SS additionally is caused to step rapidly to the home position thereof on self-generated current impulses, the circuit for this purpose being traced as follows: positive battery on conductor 66, armature 91 and break contact of stepping magnet STP, conductor 112, make contact and armature 84 of relay AC, conductor 85, stepping magnet STP and thence by way of wipers 1 or 2 and their associated switch banks to negative battery on conductor 65. With switch SS in the home position thereof, spurious stepping of the switch beyond the home position at the end of the three second interval provided by the anti-countermine device is prevented by the delay in the closure of make contacts of relay TD—B, as previously described.

Switch SS preferably is of a type adapted to make approximately fifty steps a second, when operating on self-generated impulses, in order to insure that the switch will be restored to the home position thereof within the protective interval provided by the anti-countermine device. For this reason, a countermine device adapted to provide an interval which safely exceeds the self-restoring time of the switch must be employed, it being recalled that negative battery is applied to one terminal of the detonator momentarily when the operate currents to relays RE and AC are interrupted at the end of the protective interval provided by the anti-countermine device and that positive battery is applied continuously to the other terminal of the detonator when the wipers of switch SS engage contacts 5 through 43 of the respective banks thereof.

Briefly stated in summary, the present invention contemplates the provision of a new and improved mine firing system adapted to be controlled by a plurality of changes in the magnetic field received within predetermined intervals of time in which a predetermined number of such changes are required to fire the mine beneath a vulnerable portion of a selected vessel, and in which means are provided for preventing the premature detonation of the mine by mine sweeping operations or as the result of a countermining operation.

While the invention has been described with respect to a particular example thereof which gives satisfactory results, it will be understood by those skilled in the art to which the invention pertains, after understanding the invention, that various changes and modifications may be employed without departing from the spirit and scope of the invention and it is our intention, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. A submarine mine of the character disclosed arranged within a magnetic field, means adapted to detect changing conditions within said field and to generate electrical signals corresponding thereto, a sensitive relay electrically connected to said detecting means and adapted to be operated in response to said signals, an electroresponsive rotary selector switch, means including a pair of slow releasing relays for causing the electroresponsive selector switch to be stepped ahead through one complete rotation after the stepping operation thereof is initiated, means including a control relay controlled by said sensitive relay for initiating the stepping operation of the selector switch from an initial unoperated position thereof, means controlled by the selector switch for restoring said sensitive relay to a responsive position thereof when the selector switch has stepped ahead a predetermined number of steps beyond the initial position thereof, a firing circuit having a detonating device therein, and means controlled by the selector switch and said control relay for closing said firing circuit when the sensitive relay operates in response to a changing condition within the magnetic field occurring during a predetermined interval of time measured by the remaining step-by-step movement of the selector switch through one cycle of operations thereof.

2. In a submarine mine of the character disclosed arranged within a magnetic field, a pickup coil adapted to generate electrical signals as the field is changed, a sensitive relay connected to said pickup coil and adapted to be operated thereby, a rotary selector switch having a plurality of wipers adapted to be stepped ahead into engagement with the contacts of their associated switch banks in succession as the switch operates, means including at least one slow releasing relay for causing the selector switch to be stepped ahead at predetermined intervals of time and through one complete rotation after the operation thereof is initiated, means controlled by said sensitive relay for initiating the operation of the selector switch, means controlled by the selector switch for restoring the sensitive relay to an initial responsive position thereof when the switch has stepped ahead a predetermined number of steps beyond the initial position thereof, a mine firing circuit, and means including the selector switch and said initiating means for closing said firing circuit when the sensitive relay responds to one of said signals during a predetermined period of time measured by a predetermined number of additional step-by-step movements of the selector switch.

3. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by signals generated thereby, a control relay adapted to be operated by said sensitive relay, a rotary switch stepping mechanism adapted to be set in operation by said control relay, means including at least one slow releasing relay for causing the switch stepping mechanism to operate successively at regular predetermined intervals of time until the mechanism has completed a cycle of operations thereof, means on said control relay for operatively disconnecting said sensitive relay from said sensing means while the control relay is operated, means controlled by said switch stepping mechanism for restoring the sensitive relay to a responsive condition thereof when a predetermined period of time has elapsed after a first change in the magnetic field has been sensed, a mine firing circuit, and means controlled by said control relay and said stepping mechanism for closing the mine firing circuit in response to a second change in the magnetic field caused by the continued movement of the vessel after the sensing means has been rendered effective during said cycle of operations.

4. In a submarine mine of the character disclosed arranged within a magnetic field, means for detecting changes in the magnetic field caused by the movement of a vessel within the vicinity of the mine and for generating electrical signals corresponding to said changes, a sensitive relay adapted to be operated by said signals, a rotary selector switch adapted to be stepped ahead from an initial unoperated position through one complete rotation thereof in response to the operation of said sensitive relay, means controlled by said switch for arming the mine for a predetermined interval of time when the switch has stepped ahead a predetermined number of steps beyond said initial position, and means controlled by the sensitive relay and the selector switch for firing the mine when the sensitive relay responds to a second signal corresponding to a second change in the magnetic field caused by movement of said vessel within the vicinity of the mine during said predetermined interval of time.

5. In a submarine mine of the character disclosed, means for detecting the movement of a vessel within the vicinity of the mine, a sensitive relay adapted to be opereated in response to signals generated by said detecting means, means for adjusting the sensitivity of response of said relay to a predetermined change in the magnetic field adjacent the mine, a rotary switch settable to different settings in succession, a control relay adapted to be operated by said sensitive relay, said control relay having means for operatively disconnecting the sensitive relay from said detecting means and for setting said rotary switch in operation as the control relay operates, circuit means including the switch for causing the switch to step through one complete rotation thereof when the switch is set in operation, means controlled by the rotary switch for releasing said sensitive relay when the rotary switch has been stepped ahead to a predetermined setting, a mine firing circuit including the selector switch, and means controlled by said control relay for closing said firing circuit when the control relay is operated by the sensitive relay during the continued movement of the rotary switch beyond said predetermined setting.

6. In a submarine mine of the character disclosed arranged within a magnetic field, means for detecting a plurality of changing conditions within said field and adapted to generate electrical signals respectively corresponding thereto, an electrical relay adapted to be operated in response to signals generated by said detecting means and having means for rendering the relay unresponsive as the relay operates, operable means for measuring a predetermined interval of time during the operation thereof, means for operating the time measuring means, means controlled by said electrical relay for initiating the operation of said time measuring means when a first field change is detected by said detecting means, means controlled by the time measuring means for restoring the electrical relay to a responsive condition, a mine firing circuit, and means controlled by the electrical relay and the time measuring means for closing the firing circuit when the relay operates in response to a second signal corresponding to a second change in the magnetic field occurring within a predetermined interval of time measured by the time measuring means.

7. In a submarine mine of the character disclosed arranged within a magnetic field, means for detecting a changing condition within said magnetic field and adapted to generate electrical signals respectively corresponding thereto, a sensitive relay adapted to be operated by said signals and having means for rendering the relay unresponsive as the relay operates, a control relay adapted to be operated by said sensitive relay, an electroresponsive stepping switch having a plurality of switch wipers settable to an initial home position and a plurality of moved positions and adapted to engage a plurality of contacts in succession corresponding to different positions of the switch, means including a pair of slow releasing relays for causing the switch to be stepped ahead through one complete rotation when the stepping operation is initiated, means controlled by the control relay for initiating the operation of the switch, means controlled by said switch for forcibly restoring said sensitive relay to an initial position and restraining the relay in the initial position when the switch has stepped ahead to a predetermined moved position, means controlled by the switch for releasing said sensitive relay as the switch steps to the next succeeding moved position beyond said predetermined moved position, and a mine firing circuit including said initiating means, said firing circuit being closed when the sensitive relay operates in response to a second signal corresponding to a second changing condition within the magnetic field occurring within a predetermined interval of time measured by the switch as it steps beyond said next succeeding moved position.

8. In a submarine mine of the character disclosed arranged within a magnetic field, an induction pickup coil adapted to detect changing magnetic conditions within said field and to generate electrical signals corresponding thereto, a sensitive relay electrically connected to said coil and adapted to operate in response to said signals and having means for locking the relay in the operated position thereof as the relay operates, an electromagnet adapted to reset the sensitive relay forcibly to an initial position and to restrain the relay in the initial position regardless of the changing condition within said magnetic field, a rotary stepping switch settable to different positions, means controlled by the sensitive relay for initiating the stepping operation of said switch, means for causing the switch to step through one complete rotation when operation thereof is initiated, means controlled by the switch for operating said reset electromagnet when the switch has made a predetermined number of steps and for releasing the reset electromagnet when the switch has made an additional step, and a mine firing circuit including said initiating means, said firing circuit being closed when the sensitive relay operates in response to a second signal corresponding to a second changing condition within the magnetic field occurring within a predetermined interval of time measured by the switch as it reaches and thereafter steps beyond the position corresponding to said additional step.

9. In a submarine mine of the character disclosed arranged within a magnetic field, means for detecting changes in said magnetic field and generating electrical signals corresponding thereto, means for measuring a predetermined interval of time, means for operating the time measuring means, means controlled by the time measuring means for causing the mine to be armed for a predetermined period of time measured by the time measuring means, and electrical means controlled by said signals for initiating the operation of the time measuring means when a first signal is generated and for firing the mine when a second signal is generated during said armed period.

10. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals generated thereby, electroresponsive means for measuring a predetermined interval of time, a mine firing circuit including said time measuring means, and means controlled by said sensitive relay for initiating the operation of said time measuring means and for closing said firing circuit respectively when the relay responds to a pair of signals occurring in predetermined time spaced relation.

11. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a mine firing circuit, means controlled by said sensitive relay for closing said firing circuit when the relay responds to a pair of said signals occurring in predetermined time spaced relation, means operable in response to an impulse of pressure received through the water, and means controlled by said pressure responsive means for opening said firing circuit and for operatively disconnecting the sensitive relay from the sensing means when the pressure responsive means operates.

12. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals and having means for locking the relay in an operated position thereof as the relay operates, a mine firing circuit, means controlled by said sensitive relay for closing said firing circuit when the relay responds to a pair of said signals occurring in predetermined time spaced relation, means operable in response to an impulse of pressure received through the water, and means controlled by said pressure responsive means for opening said firing circuit and for forcibly restraining the sensitive relay in a signal unresponsive condition when the pressure responsive means operates.

13. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a mine firing circuit, means controlled by said sensitive relay for closing said firing circuit when the relay responds to a pair of said signals occurring in predetermined time spaced relation, means operable in response to an impulse of pressure received through the water, means controlled by said pressure responsive means for opening said firing circuit and for forcibly restraining the sensitive relay in a signal unresponsive condition and for operatively disconnecting the sensitive relay from the sensing means when the pressure responsive means operates.

14. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a rotary selector switch adapted to be stepped ahead from an initial unoperated position through one complete rotation thereof in response to operation of said sensitive relay, a mine firing circuit including said switch and adapted to be armed thereby when the switch makes a predetermined number of steps beyond said initial position, said switch having interrupter contacts, a circuit including said switch and said interrupter contacts for operating the switch on self-interruptions, and circuit closing means operable in response to an impulse of pressure received through the water for closing said interrupter circuit for a period of time sufficient to step the switch ahead to said initial position thereof when the pressure responsive means operates during the step-by-step movement of the switch.

15. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a rotary selector switch adapted to be stepped ahead from an initial unoperated position through one complete rotation thereof in response to the operation of said sensitive relay, means controlled by said switch for arming the mine for a predetermined interval of time when the switch has stepped ahead a predetermined number of steps beyond said initial position, means controlled by the sensitive relay and the selector switch for firing the mine when the sensitive relay responds to a second signal corresponding to a second change n the magnetic field caused by movement of said vessel within the vicinity of the mine during said predetermined interval of time, said switch having interrupter contacts, a circuit including said switch and said interrupter contacts for operating the switch on self-interruptions, means operable for a relatively short interval of time in response to an impulse of pressure received through the water, and means controlled by said pressure responsive means for closing said interrupter circuit when the pressure responsive means operates during the step-by-step movement of the rotary switch.

16. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a rotary selector switch adapted to be stepped ahead from an initial unoperated position through one complete rotation thereof in response to the operation of said sensitive relay, means controlled by said switch for arming the mine for a predetermined interval of time when the switch has stepped ahead a predetermined number of steps beyond said initial position, means controlled by the sensitive relay and the selector switch for firing the mine when the sensitive relay responds to a second signal corresponding to a second change in the magnetic field caused by movement of said vessel within the vicinity of the mine during said predetermined interval of time, said switch having interrupter contacts, a circuit including said switch and interrupter contacts for operating the switch on self-interruptions, means operable for a relatively short interval of time in response to an impulse of pressure received through the water, and means controlled by said pressure responsive means for opening said firing circuit, for operatively disconnecting the sensitive relay from the sensing means, for forcibly restraining the sensitive relay in an unoperated condition, and for closing said interrupter circuit when the pressure responsive means operates during the operation of the rotary switch.

17. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a rotary selector switch adapted to be stepped ahead from an initial unoperated position through one complete rotation thereof in response to the operation of said sensitive relay, means controlled by said switch for arming the mine for a predetermined interval of time when the switch has stepped ahead a predetermined number of steps beyond said initial position, means controlled by the sensitive relay and the selector switch for firing the mine when the sensitive relay responds to a second signal corresponding to a second change in the magnetic field caused by movement of said vessel within the vicinity of the mine during said predetermined interval of time, said switch having interrupter contacts, a circuit including said switch and said interrupter contacts for operating the switch on self-interruptions, circuit closing means operable in response to an impulse of pressure received through the water for closing said interrupter circuit for a period of time sufficient to move the switch to said initial position when the pressure responsive means operates during the step-by-step movement of the switch, and means for preventing operation of the switch beyond said initial position when said circuit closing means opens at the termination of said period of time.

18. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a control relay adapted to be operated by said sensitive relay, a step-by-step rotary selector switch having normally closed interrupter contacts adapted to open as the switch operates, a mine firing circuit including said switch, a plurality of contacts on said control relay and effective as the control relay operates for disconnecting the sensitive relay from said sensing means, for closing a circuit for initiating the stepping movement of said switch from an initial unoperated position thereof, and for closing said firing circuit when the selector switch has stepped ahead a predetermined number of steps beyond said initial position, means including a time delay relay for timing the step-by-step movement of the switch, a circuit including said switch and said interrupter contacts for operating the switch on self-interruptions, means operable in response to an impulse of pressure received through the water and having circuit closing means for operating said time delay relay, said circuit closing means being adapted to be closed for a predetermined interval of time in response to said impulse of pressure, means controlled by said circuit closing means for closing said interrupter circuit thereby to restore the switch to the home position thereof, for opening said initiating and said firing circuits, and for operating said control relay, and normally closed contact means on said time delay relay and included within said initiating circuit for preventing the closure of the initiating circuit as said circuit closing means opens, thereby to prevent spurious stepping movement of the switch beyond the initial position thereof.

19. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a control relay adapted to be operated by said sensitive relay, a step-by-step rotary selector switch, means including at least one time delay relay for timing the step-by-step movement of the selector switch, a mine firing circuit including said switch, and contact means on said control relay and effective as the control relay operates for closing a circuit for initiating the operation of the switch and for closing said firing circuit when the selector switch has stepped ahead a predetermined number of steps.

20. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a first control relay adapted to be operated by said sensitive relay, a step-by-step rotary selector switch, means including a time delay relay having a pair of normally closed contacts thereon for causing step-by-step movement of said switch, a mine firing circuit including the switch, a pair of normally open contacts on said first control relay and effective as the relay operates for closing a circuit for initiating the stepping movement of the switch and for closing said firing circuit when the selector switch has stepped ahead a predetermined number of steps from an initial position, said initiating circuit including said pair of normally closed contacts, a second control relay, means operable in response to an impulse of pressure received through the water for causing said time delay relay and said second control relay to operate for a predetermined interval of time, and a plurality of contacts on said second control relay and effective as the second control relay operates for opening said initiating circuit and said firing circuit and for causing said first control relay to operate, said time delay relay having means for preventing said contacts thereon from closing until said normally open contacts have opened as the first and second control relays release in sequence at the termination of said interval, thereby to prevent spurious closing of the initiating circuit.

21. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a control relay adapted to be operated by said sensitive relay, a step-by-step rotary selector switch having normally closed interrupter contacts adapted to open as the switch operates, a mine firing circuit including said switch, a plurality of contacts on said control relay and effective as the control relay operates for disconnecting the sensitive relay from said sensing means, for closing a circuit for initiating the stepping movement of said switch from an initial unoperated position thereof, means including a time delay relay for timing the step-by-step movement of the switch, a circuit including said switch and said interrupter contacts for operating the switch on self-interruptions, means operable in response to an impulse of pressure received through the water and having circuit closing means for operating said time delay relay, said circuit closing means being adapted to be closed for a predetermined interval of time in response to said impulse of pressure, means controlled by said circuit closing means for closing said interrupter circuit thereby to restore the switch to the home position thereof, and for operating said control relay, and normally closed contact means on said time delay relay and included within said initiating circuit for preventing the closure of the initiating circuit as said circuit closing means opens, thereby to prevent spurious stepping movement of the switch beyond the initial position thereof.

22. In a submarine mine of the character disclosed, means for sensing changes in the magnetic field caused by the movement of a vessel within the vicinity of the mine and for generating electrical signals corresponding to said changes, a sensitive relay electrically connected to said field sensing means and adapted to be operated by said signals, a first control relay adapted to be operated by said sensitive relay, a step-by-step rotary selector switch, means including a time delay relay having a pair of normally closed contacts thereon for causing step-by-step movement of said switch, a pair of normally open contacts on said first control relay and effective as the relay operates for closing a circuit including said pair of normally closed contacts on said time delay relay for initiating the stepping movement of the switch, at least one pair of normally closed contacts on said first control relay for disconnecting the sensitive relay from said sensing means as the first control relay operates, a second control relay, means operable in response to an impulse of pressure received through the water for causing said time delay relay and said second control relay to be operated for a predetermined period of time, contact means on said second control relay and effective as the second control relay operates for causing said first control relay to operate, means on the time delay relay for preventing said contacts thereon from closing until said pair of normally open contacts have opened at the termination of said interval, thereby to prevent spurious closing of the initiating circuuit, means controlled by the switch for restoring the sensitive relay to an initial unoperated condition when the switch has taken a predetermined number of steps, and a mine firing circuit including said switch and said normally open contacts and adapted to be closed thereby when the first control relay is operated during the remaining step-by-step movement of the switch.

23. In a submarine mine of the character disclosed arranged within a magnetic field, means for detecting changes in said field, a mine firing circuit including a step-by-step rotary selector switch, and means controlled by said detecting means including said switch for measuring a predetermined interval of time as a first change is detected and for closing said firing circut when a second change is detected during said measured interval of time, said switch having normally closed interrupter contacts, a circuit including the switch and said interrupter contacts for operating the switch on self-interruptions, and circuit means including an element operable in response to an impulse of pressure received through the surrounding water for closing said self-interrupting circuit and opening said firing circuit.

References Cited in the file of this patent

UNITED STATES PATENTS

| | | |
|---|---|---|
| 1,310,568 | Heap et al. | July 22, 1919 |
| 1,364,615 | Cruz | Jan. 4, 1921 |
| 1,448,976 | Palmer | Mar. 20, 1923 |
| 1,491,004 | Duffie | Apr. 22, 1924 |

FOREIGN PATENTS

| | | |
|---|---|---|
| 803,907 | France | July 20, 1936 |